(12) United States Patent
Watanabe et al.

(10) Patent No.: US 7,074,354 B2
(45) Date of Patent: Jul. 11, 2006

(54) PROCESS FOR PRODUCING COLORED SHAPED ARTICLE FROM CURABLE RESIN, COLORED SHAPED ARTICLE PRODUCED FROM CURABLE RESIN, AND SHAPING APPARATUS

(75) Inventors: Katsuyuki Watanabe, Tokyo (JP); Koji Nakajima, Tokyo (JP); Kenji Yamazawa, Saitama (JP); Masahiro Anzai, Saitama (JP); Kiwamu Kase, Saitama (JP)

(73) Assignees: Nabtesco Corporation, Tokyo (JP); Riken, Saitama (JP)

( * ) Notice: Subject to any disclaimer, the term of this patent is extended or adjusted under 35 U.S.C. 154(b) by 338 days.

(21) Appl. No.: 10/089,327

(22) PCT Filed: Jul. 26, 2001

(86) PCT No.: PCT/JP01/06422

§ 371 (c)(1),
(2), (4) Date: Mar. 27, 2002

(87) PCT Pub. No.: WO02/09928

PCT Pub. Date: Feb. 7, 2002

(65) Prior Publication Data
US 2004/0105967 A1      Jun. 3, 2004

(30) Foreign Application Priority Data
Jul. 28, 2000   (JP)   .............................. 2000-229191

(51) Int. Cl.
*B29C 41/22*   (2006.01)
(52) U.S. Cl. ........................ 264/78; 264/245; 264/255; 264/267
(58) Field of Classification Search ................ 264/245, 264/255, 267, 401, 78; 428/195.1, 205
See application file for complete search history.

(56) References Cited

U.S. PATENT DOCUMENTS 5,059,266 A   10/1991   Yamane et al.

(Continued)

FOREIGN PATENT DOCUMENTS

EP   0833205   4/1998

(Continued)

OTHER PUBLICATIONS

Pétillon, N., et al., "Color Stereophotolithography: A Method of 3-D Color Imaging" Journal of Imaging Science and Technology, Soc. for Imaging Science and Technology, Springfield, VA, vol. 40, No. 1, 1996, pp. 42-49.

*Primary Examiner*—Edmund H. Lee
(74) *Attorney, Agent, or Firm*—David N. Lathrop, Esq.; Gallagher & Lathrop

(57) ABSTRACT

In coloration of a shaped article composed of a curable resin, the addition operation can be reliably conducted and a reliable coloration effect can be obtained in both the single-color addition and in the multicolor addition. A liquid-phase, non-colored photo-curable resin is cured by irradiation with laser light and a lowermost layer $5_n$ is formed. A liquid-phase, photo-curable resin is applied on the upper surface thereof and a colored layer $5_{n-1}$ comprising a cured non-colored region and a liquid-phase pool region is formed. A color ink is drop-wise added to the liquid-phase pool region. The pool region is irradiated with laser light and cured to the same hardness as that of the non-colored region. A block-like coating film having the prescribed thickness if formed from the surface coating film produced by the color ink covering the pool region. As a result, the formation of the next layer (colored layer $5_{n-2}$) on the upper surface of colored layer $5_{n-1}$ can be conducted without obstacles. Colored layer $5_{n-2}$ through colored layer $5_3$ are formed by repeating this process, a colored layer $5_2$ is formed on the upper surface of colored layer $5_3$, and then the uppermost layer $5_1$ is formed on the colored layer $5_2$.

6 Claims, 6 Drawing Sheets

U.S. PATENT DOCUMENTS

| | | |
|---|---|---|
| 5,096,530 A | 3/1992 | Cohen |
| 5,278,442 A * | 1/1994 | Prinz et al. .................. 257/417 |
| 5,340,433 A | 8/1994 | Crump |
| 5,594,652 A * | 1/1997 | Penn et al. .................. 700/119 |
| 6,165,406 A * | 12/2000 | Jang et al. .................. 264/308 |

FOREIGN PATENT DOCUMENTS

| | | | |
|---|---|---|---|
| EP | 0535984 | | 8/1998 |
| JP | 5212804 | | 8/1993 |
| JP | 5212806 | | 8/1993 |
| JP | 5286040 | | 11/1993 |
| JP | 0118297 | | 1/2001 |
| WO | WO 9501257 | | 1/1995 |
| WO | WO 9709168 | * | 8/1996 |
| WO | WO 9709168 | | 3/1997 |
| WO | WO 0007071 | | 2/2000 |
| WO | WO 0133510 | | 5/2001 |

\* cited by examiner

PROCESS FOR PRODUCING COLORED SHAPED ARTICLE FROM CURABLE RESIN, COLORED SHAPED ARTICLE PRODUCED FROM CURABLE RESIN, AND SHAPING APPARATUS

BACKGROUND OF THE INVENTION

1. Field of the Invention

The present invention relates to a process for producing colored shaped article from curable resin, colored shaped article produced from curable resin, and shaping apparatus.

2. Description of the Related Art

Coloration of shaped article produced by a photo-model creation method, that is, by lamination and shaping using laser beam irradiation of a photo-curable resin is greatly limited by the color (usually, a semitransparent color) inherent to the resin itself. For this reason, a method has been used by which a colorant was added to the produced shaped article upon completion of a series of lamination and shaping operations.

However, with the above-mentioned conventional coloration method, large-scale equipment is required to add a colorant to the shaped article. Another problem is that when the object of coloration is a shaped article having a complex shape, or when a shaped article having a complex shape is the object of coloration, as mentioned above, and multicolor addition is conducted which uses a plurality of colorants, the addition operation itself is difficult to implement with the conventional equipment and there are portions that cannot be colored because of complex shape of the shaped article.

Accordingly, with the foregoing in view, a method has been attempted by which a colorant is added on the upper surface of the layers each time the layer is formed by the above-mentioned photo-model creation method, that is, a method for curing a photo-curable resin by laser beam irradiation. In the shaped article having a colorant added thereto by this method, as shown in FIG. 1, the thickness h' of coating layers $3_1 \sim 3_n$ formed from a colorant is much less than the thickness h of layers $1_1 \sim 1_n$ formed from the photo-curable resin, but when the shaped article is viewed from the upper surface, the color of the colorant appears as a color of the shaped article.

However, when the shaped article is viewed from the side surface, since the thickness h' of the coating layers $3_1 \sim 3_n$ is very small, as mentioned above, the color (usually, a semi-transparent color) inherent to the resin itself, rather than the color of the colorant, appears as the color of the shaped article. The resulting problem is that the reliable coloration effect cannot be obtained and, therefore, the above-described colorant addition method cannot be considered effective.

SUMMARY OF THE INVENTION

Accordingly, it is an object of the present invention to conduct reliably the addition operation and to obtain a reliable coloration effect in coloration of a shaped article composed of a curable resin, not only in case of a single-color addition employing a single colorant, but also in case of multicolor addition using a plurality of colorants.

Another object of the present invention is to conduct reliably the addition operation and to obtain a reliable coloration effect in coloration of a shaped article composed of a curable resin, without using a large-scale equipment.

The colored shaped article composed of a curable resin, which is the first aspect of the present invention, comprises a plurality of layers formed by lamination and shaping of a curable resin, wherein at least one layer of the plurality of layers has a non-colored region where no colorant was added and a colored region formed by adding a colorant, and the colored region is formed so that the color of the colorant can be recognized from all directions of the completed colored shaped article.

With such a configuration, since the colored region is formed so that the color of the colorant can be recognized from all directions of the completed colored shaped article, a reliable coloration effect can be obtained.

In the preferred embodiment relating to the first aspect of the present invention, a photo-curable resin is used as the curable resin. Examples of suitable colorants include compositions prepared by a non-volatile ink using a pigment for ceramics, a colorless finely powdered dye which is colored under UV irradiation, or an ink using a pigment or dye as the raw material with a liquid-phase, curable resin, compositions prepared by mixing a pigment or dye with a liquid-phase solvent other than a curable resin, such compositions having good affinity with the curable resin, compositions prepared by mixing colored fibers or color beads with a liquid-phase, curable resin, and compositions prepared by mixing colored fibers or color beads with a liquid-phase solvent other than a curable resin, such compositions having good affinity with the curable resin.

A process for producing colored shaped article from curable resin in accordance with the second aspect of the present invention relates to a colored shaped article comprising a plurality of layers formed by lamination and shaping of a curable resin, wherein at least one layer of the plurality of layers has a non-colored region where no colorant was added and a colored region formed by adding a colorant, this process comprising a step of forming the colored region in the liquid-phase, curable resin so that the color of the colorant can be recognized from all directions of the completed colored shaped article and then curing the curable resin and forming a colored region, and a step of curing the curable resin in a liquid-phase state and forming the non-colored region.

A process for producing colored shaped article from curable resin in accordance with the third aspect of the present invention relates to a colored shaped article comprising a plurality of layers formed by lamination and shaping of a curable resin, wherein at least one layer of the plurality of layers has a colored region formed by adding a colorant, this process comprising the steps of forming an external wall by curing a region of prescribed width along the contour line of the colored region, adding a colorant to the region in a liquid-phase state inside the external wall, and curing said colored region.

In the preferred embodiment relating to the third aspect of the present invention, a step of forming partition walls by curing the partition zones of prescribed thickness inside the region which is to be colored is implemented prior to the step of adding the colorant. Furthermore, the above-mentioned colored region is formed by adding the prescribed amounts of the colorant at the prescribed distance intervals by using an addition mechanism displaced by feedback-corrected pulse signals. The step of adding the colorant comprises a step of removing the liquid-phase, curable resin present in the region which is to be colored and a step of adding the colorant into the region after the removal of the curable resin. Furthermore, the addition of colorants of a plurality of colors into the above-mentioned region which is to be colored is conducted by adding the colorants in a sequence starting from the colorant with a color of the highest priority based on the predetermined order of priority.

This is conducted to prevent the reduction in size of the colored region caused by multicolor addition and to facilitate recognition of each color.

A shaping apparatus according to the fourth aspect of the present invention forms a desired shaped article by lamination and shaping of a liquid-phase, curable resin, this apparatus comprising an addition mechanism that can be displaced in at least the horizontal direction to add a liquid-phase or powdered colorant to the liquid-phase, curable resin.

In the preferred embodiment relating to the fourth aspect of the present invention, a needle mechanism comprising a first colorant supply hole extending, for example, in the axial direction thereof and a second colorant hole perpendicular to the axial direction is employed as the addition mechanism. Such a needle mechanism has a strength and shape allowing for insertion into the liquid-phase, curable resin and three-dimensional displacement in the curable resin.

An apparatus for the implementation of coloration and shaping will be described below. For example, an apparatus with a structure in which a dispenser is supported on a positioning/moving mechanism so that it can be two-dimensionally displaced, such as an XY plotter, or an apparatus with a structure in which a dispenser is supported on a positioning/moving mechanism so that it can be three-dimensionally displaced, such as a robot arm, can be used as the above-mentioned apparatus. Furthermore, apparatuses with a structure in which a multi-nozzle head (contains no needle-like parts) such as a head of a typical ink-jet printer is supported on an XY plotter or robot arm can be also used as the above-mentioned apparatus. When an XY plotter is used for the positioning/moving mechanism, the control of various parts of the apparatus is conducted, for example, based on a standard XY table, and when a robot arm is used instead of the XY plotter, the control of various parts of the apparatus is conducted, for example, based on a standard XYZ table. In any case, the above-mentioned apparatus is not limited to the apparatuses having the configuration described above.

DESCRIPTION OF THE PREFERRED EMBODIMENTS

The embodiments of the present invention will be described in detail below with reference to the appended figures.

Figure 1:
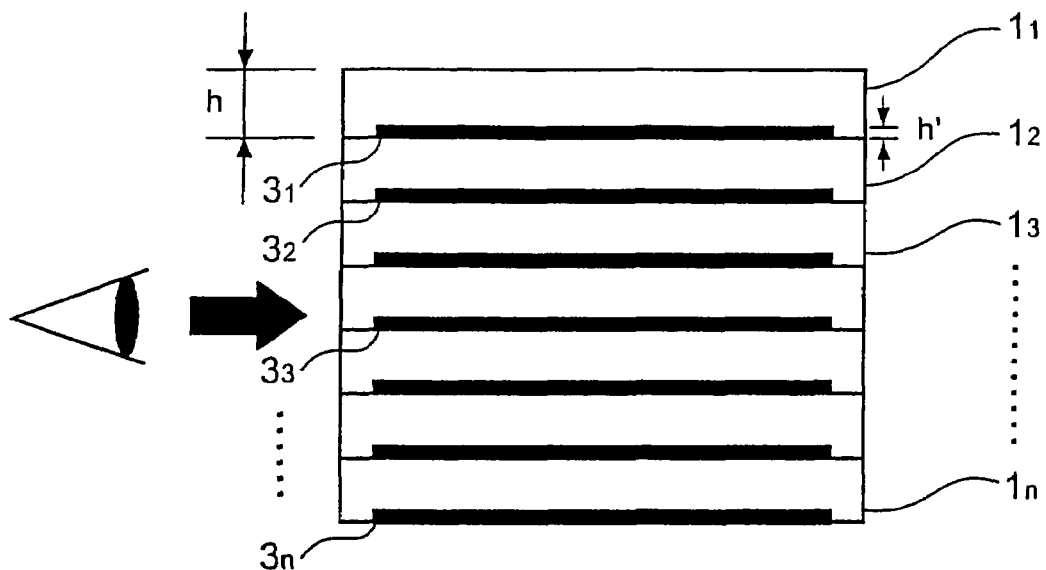
FIG. 1 is a cross-sectional view of a colored shaped article composed of a photo-curable resin colored by the conventional colorant addition method.
Figure 2:
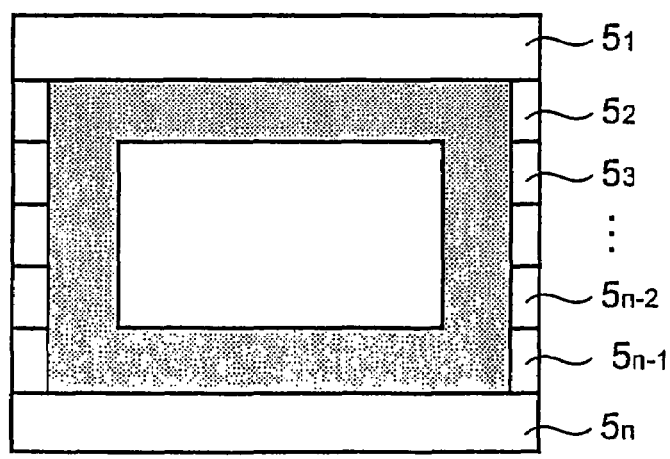
FIG. 2 is a cross-sectional view illustrating an example of the colored shaped article composed of a photo-curable resin relating to an embodiment of the present invention.

FIG. 2 is a cross-sectional view illustrating an example of the colored shaped article composed of photo-curable resins relating to an embodiment of the present invention.

The colored shaped article has a structure obtained by lamination and shaping of a photo-curable resin. The shape of the entire shaped article is not limited to any specific shape, and a variety of shapes such as rectangular (square), round, elliptical, and the like can be assumed for a shape viewed from above or below thereof. In the colored shaped article, as shown in FIG. 2, the uppermost layer $5_1$ and a lowermost layer $5_n$ are the layers (usual layers) composed of a non-colored photo-curable resin, and a plurality of layers laminated between the uppermost layer $5_1$ and lowermost layer $5_n$ are the layers (colored layers) $5_2$ through $5_{n-1}$ composed of the photo-curable resin colored in various colors.

Both usual layers $5_1$, $5_n$ are provided to prevent the decrease in strength of the colored shaped article, which is the cured product, and to protect the coating film comprising a colorant (namely, various color inks, for example volatile inks using a pigment for ceramics). The usual layers $5_1$, $5_n$ are formed only by a curing process (the process in which a non-cured photo-curable resin, that is, a liquid-phase photo-curable resin is cured by illuminating with a laser light) and have the respective prescribed thickness (N layer fraction).

Figure 3:
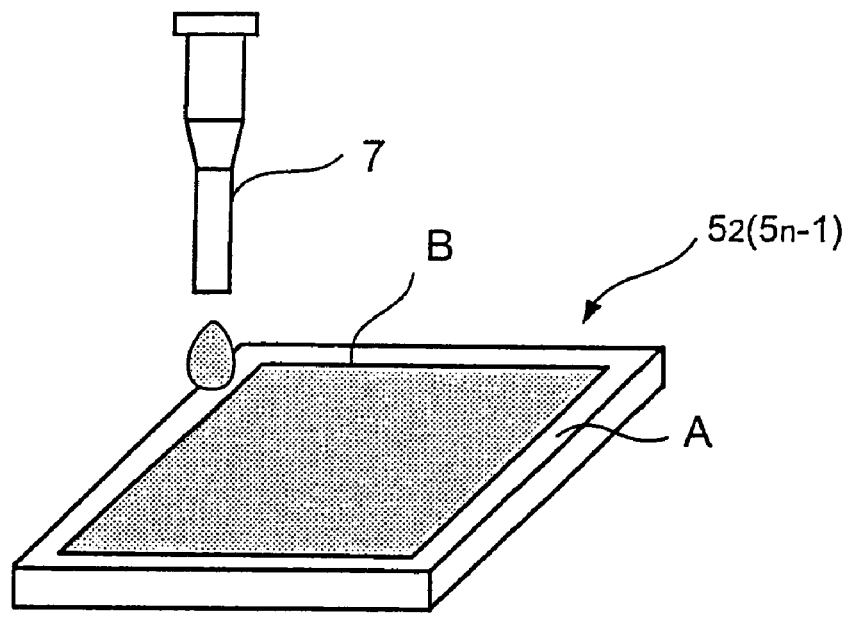
FIG. 3 is a perspective view of a colored layer composed of a photo-curable resin, which constitutes the colored shaped article shown in FIG. 2.

FIG. 3 is a perspective view illustrating a colored layer used as a colored layer $5_2$ positioned in the uppermost portion and a colored layer $5_{n-1}$ positioned in the lowermost portion, of the colored layers $5_2 \sim 5_{n-1}$ shown in FIG. 2.

Those colored layers $5_2$, $5_{n-1}$ are formed so that the colors coated from the upper and lower surfaces of the colored shaped article can be recognized and they comprise a non-colored region A called an outer frame (external wall) and a colored region B formed in the so-called pool region surrounded by the external wall. The non-colored region A is formed only by the above-described curing process, similarly to the usual layers ($5_1$, $5_n$).

On the other hand, the colored region B is formed by implementing a process (coloring process) in which the non-cured state (that is, a liquid-phase state) is maintained, without irradiation with the laser beam, during curing of the non-colored region A and a colorant is added to the region in the non-cured state, and then by implementing a curing process similar to the above-described process on this region. Curing after coloration of the region in the non-cured state is implemented as processing designed to prevent a negative effect on the formation of the next layer on the aforesaid layer. Furthermore, coloration, for example, with a color ink, of the region in the non-cured state which becomes the colored region B is conducted, for example, by dropping the color ink onto the region in the non-cured state from a nozzle 7 of a dispenser (not shown in the figure) which is an addition mechanism attached to the front end of a two-axis (XY) robot arm (not shown in the figure).

Figure 4:
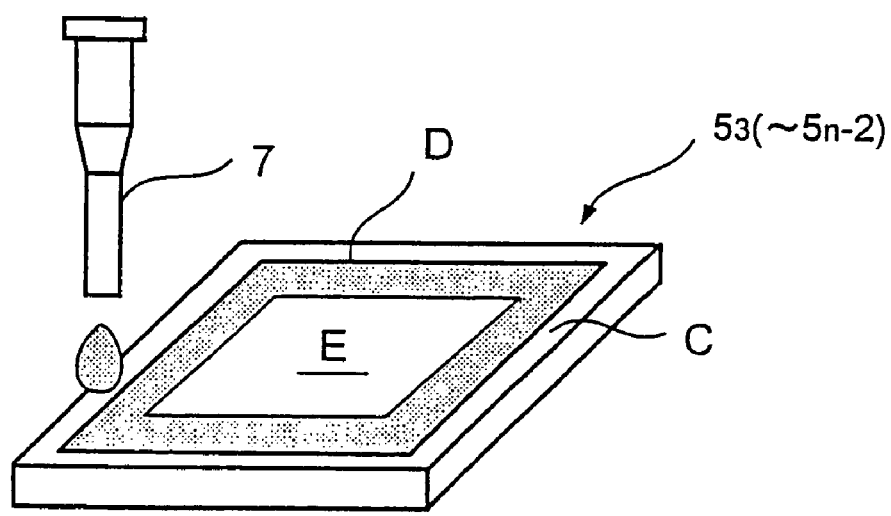
FIG. 4 is a perspective view of a colored layer composed of a photo-curable resin of a type different from that in FIG. 3, which constitutes the colored shaped article shown in FIG. 2.

FIG. 4 is a perspective view illustrating the colored layers used as all remaining layers (that is, colored layers $5_3$ through $5_{n-2}$) sandwiched between the colored layers $5_2$, $5_{n-1}$ of the colored layers $5_2$~$5_{n-1}$ shown in FIG. 2.

The colored layers $5_3$ through $5_{n-2}$ are employed for the applied colors to be visible from the side surface of the colored shaped article, each of them having an outer-contour non-colored region C called an external wall, a colored region D formed in a region called a groove of a prescribed width that was formed over the entire perimeter along the inner side of the external wall, and an inner-contour non-colored region E on in the inner side of the groove. The outer-contour and inner-contour non-colored regions (C, E) are both formed by the curing process similar to that used to form the above-described usual layers ($5_1$, $5_n$).

On the other hand, the colored region D, similarly to the colored layers ($5_2$, $5_{n-1}$) shown in FIG. 3 is formed by maintaining the non-cured state, without irradiation with the laser light, during curing of the outer-contour and inner-contour non-colored regions (C, E) and implementing a coloring process on the region in the non-cured state, and then implementing the curing process (processing creating no obstacles for the formation of the next layer) similar to the above-described process on this region. Furthermore, coloration, for example, with a color ink, of the region in the non-cured state which becomes the colored region D is conducted by dropping the color ink onto the region in the non-cured state from a nozzle 7 of a dispenser (not shown in the figure) similar to the above-described dispenser.

The colored shaped article of the above-described configuration can be fabricated by the following process.

First, a non-colored photo-curable resin in a non-cured state (liquid-phase state) is irradiated with a laser beam. As a result, the photo-curable resin is cured and a usual layer with a thickness of N layer fraction is formed as a lowermost layer $5_n$. Then, a liquid-phase photo-curable resin is coated to the prescribed thickness on the upper surface of the lowermost layer $5_n$, only in the region corresponding to the external wall, where the colored layer $5_{n-1}$ shown in FIG. 2 is to be formed, and cured by irradiation with a laser beam, thereby forming a non-colored region A. As a result, the liquid-phase, photo-curable resin coated on the upper surface of lowermost layer $5_n$ is separated into the cured non-colored layer A and a pool which is in a non-cured state (liquid-phase state), that is, a region (the above-described colored region B) which is cured after coloration by coating with a color ink. This pool is set to have the size (dimensions), and shape such as to produce no effect on the lamination and shaping of the colored shaped article.

Upon such a separation of the liquid-phase photo-curable resin into the cured non-colored region A and the pool in a non-cured state, a color ink is dropped as a colorant from the nozzle 7 of the above-mentioned dispenser (not shown in the figure). It is preferred that the color ink used has a very good affinity with the liquid-phase photo-curable resin. In the present embodiment, inks of four colors, red (R), blue (B), yellow (Y), and black (B), are used as the color ink.

When the color ink is dropped onto the pool, because of the above-mentioned affinity it diffuses into the photo-curable resin in a non-cured state. As a result, the color ink is added to the entire pool. Once the color ink has been added to the photo-curable resin (that is, the pool) in a non-cured state, the pool is irradiated with a laser beam and the region that becomes the colored region B is cured to the same hardness as the aforesaid non-colored region A. As a result, a block-like coating film having a constant thickness is produced from the surface-like coating film formed by the color ink that is applied on the pool.

Irradiation with a laser beam of the same energy as that used for curing of the non-colored region A is sometimes insufficient to form the colored region B by curing the above-mentioned region (pool) of the photo-curable resin, which is in a liquid-phase state and has a color ink added thereto, to the same hardness as that of the non-cured region A. In such a case, it is necessary to use a special curing method, for example, a method of setting a long exposure time during laser beam irradiation or a method of multiple exposure during laser beam irradiation as means for increasing the light energy projected on the region in a liquid-phase state (that is, the region which is to become the colored region B).

Forming the colored region B by curing the region in a liquid-phase state which has a color ink added thereto makes it possible to form, without obstacles, the next layer (that is, colored layer $5_{n-2}$) on the upper surface of colored layer $5_{n-1}$.

Then, a photo-curable resin is added to the prescribed thickness onto the upper surface of colored layer $5_{n-1}$, and the region corresponding to the external wall and inner contour, where the colored layer $5_{n-2}$ shown in FIG. 2 is to be formed, is cured by irradiation with a laser beam to obtain an outer-contour non-colored region C and an inner-contour non-colored region E. As a result, the photo-curable resin coated on the upper surface of colored layer $5_{n-1}$ is separated into the cured non-colored regions C, E and a groove in a non-cured state, that is, a region which is to become the above-described colored region D. The groove, similarly to the above-described pool, is set to have the size (dimensions), and shape such as to produce no effect on the lamination and shaping of the colored shaped article.

Once the photo-curable resin has thus been separated into the cured non-colored regions C, E and the groove in a non-cured state, a color ink having a very good affinity with the photo-curable resin, as in the above-described process, is dropped as a colorant from the nozzle 7 of the dispenser (not shown in the figure). Therefore, because of the affinity, the color ink diffuses into the photo-curable resin which is in a non-cured state. As a result, the color ink is added to the entire groove. After such an addition of the color ink to the photo-curable resin (that is, the groove) which is in a non-cured state, the groove is irradiated with a laser beam and the region that is to become the colored region D is cured to the same hardness as that of the non-colored regions C, E. As a result, a block-like coating film with a constant thickness is produced from the surface-like coating film formed by the color ink coated on the groove. Similarly to the above-described process, when the region which is to become the colored region D is cured, the irradiation with a laser beam of the same energy as that used for curing of the non-colored regions C, E is sometimes insufficient to obtain the hardness of colored region D of the same order as that of non-colored regions C, E.

In such a case, in the laser beam irradiation of the region which is to become the colored region D, it is also necessary to increase the light energy projected onto the region in a non-cured state (that is, the colored region D) by using a special curing method, for example, a method of setting a long exposure time or a method of multiple exposure, similarly to the above-described laser beam irradiation of the region which is to become the colored region B.

Thus, forming the colored region D by curing the region in a liquid-phase state which has a color ink added thereto makes it possible to form, without obstacles, the next layer on the upper surface of colored layer $5_{n-2}$.

It is suffice that only two patterns, a pool and a groove, be used as the patterns of the regions in a liquid-phase state which are to become the colored regions in the colored layers $5_2$~$5_{n-1}$. If the region in a liquid-phase state is set to have a pool-like shape, color recognition can be reliably conducted even when the produced colored shaping article is viewed from the top-bottom direction. On the other hand, when the region in a liquid-phase state is set to have a groove-like shape, color recognition can be conducted only when the produced colored shaped article is viewed from the lateral direction. However, the advantage of such a setting is that the time required for the coloration process can be shortened and the amount of ink used in the coloration process can be reduced.

Once the colored layers $5_{n-2}$~$5_3$ have been formed by the repetition of the above-described process, a colored layer $5_2$ having the same configuration as the above-described colored layer $5_{n-1}$ is formed on the upper surface of colored layer $5_3$ and then a non-colored layer $5_1$ having the same configuration as the non-colored layer $5_n$ is formed on the upper surface of colored layer $5_2$, thereby forming the colored shaped article.

The addition of the above-described photo-curable resin (liquid resin) is conducted with a recoater (not shown in the figures) provided in a shaping apparatus (not shown in the figures) used for lamination and shaping of the colored shaped article. Furthermore, connection between the nozzle 7 of dispenser (not shown in the figures) and a syringe (tank) (not shown in the figures) is provided with a tube (not shown in the figures).

Furthermore, a controller (not shown in the figures) controlling the units of the shaping apparatus contains shaping data used when the usual layers ($5_1$, $5_n$) are formed, shaping data used when the colored layers ($5_2$, $5_{n-1}$) are formed, and shaping data used when the colored layers ($5_3$ through $5_{n-2}$) are formed. The controller (not shown in the figures) provides for lamination and shaping of the above-mentioned colored shaped article by appropriately using a variety of the shaping data.

In the above-described embodiment, a colorant was added to the layers ($5_2$ through $5_{n-1}$), which are to be colored, in the process of lamination and shaping of the colored shaped article. Therefore, the process for adding the colorant after the completion of the series of shaping operations was unnecessary.

Furthermore, since the colorant was added in the course of lamination and shaping process, the automation of colorant addition operation can be conducted together with the automation of shaping operation carried out with the shaping apparatus. Therefore, the addition operation can be conducted while the shaping operation is being conducted, and not only single-color, but also multicolor addition can be conducted.

Moreover, since the coating surface of colored layers is sealed inside the colored shaped article, peeling of the coated films from the colored layers under the effect of external impacts or chemical changes caused by adhesion of reagents and the like is essentially impossible.

Figure 5:
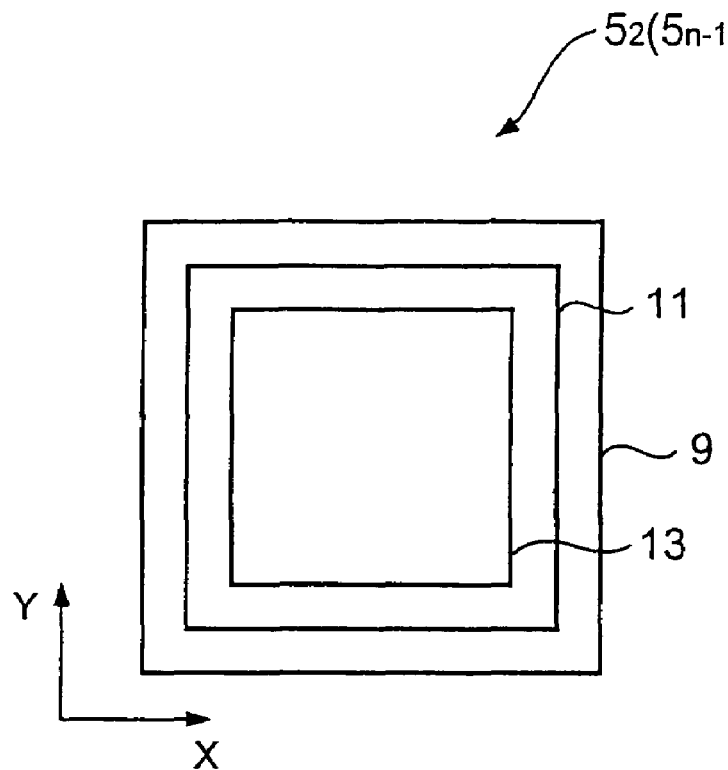
FIG. 5 illustrates an example of a method for forming a colored layer composed of a photo-curable resin, which is shown in FIG. 3.

FIG. 5 illustrates an example of a method for forming a layer (colored layer) consisting of a colored photo-curable resin described with reference to FIG. 3.

In FIG. 5, the external wall front surface 9 of the above-described colored layers ($5_2$, $5_{n-1}$) is formed based on the data (front surface data) representing the external wall front surface 9 determined by slicing the STL data. Furthermore, the external wall inner surface 11 of the colored layers ($5_2$, $5_{n-1}$) is formed based on the data (inner surface data) determined by offsetting the above-mentioned front surface data inward through a certain distance. The external wall inner surface 11 is equivalent to the outer periphery of the pool, that is, the region which is to become the colored region B. Furthermore, a rectangular line 13 indicating the trajectory of the position of color ink, that is, the colorant, dropping on the region which is to become the colored region B is determined based on the data (data for ink dropping) found by offsetting the inner surface data inward through a certain distance.

When the colored layers ($5_3$ through $5_{n-2}$) shown in FIG. 4 are formed, the external wall front surface 9 is formed based on the front surface data, the outer periphery of the groove, that is, the region which is to become the colored region D, is determined on the external wall inner surface 11, and the inner periphery of the region which is to become the colored region D is determined based on the data found by offsetting the inner surface data inward through a certain distance exceeding the rectangular line 13 for ink dropping.

Trial fabrication of colored layers ($5_2$, $5_{n-1}$) shown in FIG. 3 and colored layers ($5_3$~$5_{n-2}$) shown in FIG. 4 conducted by the inventors demonstrated that the appropriate thickness of the external wall produced for setting the pool (or groove) is about 0.5–5.0 mm. If the wall thickness is less than 0.5–5 mm, the color ink drop-wise added into the pool (or groove) will ooze out of the pool (groove), and when the wall thickness is greater than the above value, the coloration of the completed colored shaped article becomes indistinct.

Furthermore, the rectangular line 13 representing the trajectory of the color ink dropping position is preferably set in a position at a distance of about 1.0 to 5.0 mm from the external wall inner surface 11, though the diffusion surface area may vary depending on the shape of the formed colored shaped article and the relationship between the surface tension of the colored ink which is drop-wise added and the photo-curable resin in a liquid-phase state.

The composition prepared by dissolving a powder consisting of colorless particles of a very small diameter which are characterized by the ability to be colored under UV irradiation in a photo-curable resin was used as a dye (color ink) for coloration employed for the test. Since the particles were colorless, they produced no adverse effect on the UV transmissivity in the photo-curable resin even after they were drop-wise added to the photo-curable resin in a liquid-phase state. Accordingly, they did not hinder the curing process.

Figure 6:
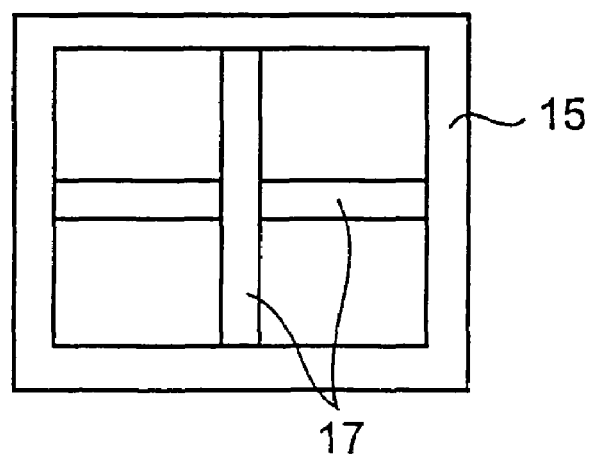
FIG. 6 illustrates a modification of the formation method shown in FIG. 5.

FIG. 6 illustrates a modification of the formation method described with reference to FIG. 5

In this modification, in order to prevent the color ink coated on a portion of the above-described pool region, that is, a portion of the region which is to become the colored region B, in the colored layers ($5_2$, $5_{n-1}$) shown in FIG. 3, from flowing out or diffusing from this region into other regions, a wall 15 is provided on the outer periphery of this region. Furthermore, partition walls 17 are also provided to prevent mixing of color inks of different colors when multicolor addition is conducted on a portion of this region.

The appropriate thickness of walls 15, 17 is about 0.5–5.0 mm, though it depends on the shape of the region. The wall thickness may be decreased to facilitate the observation of color provided to a photo-curable resin in a liquid-phase state. However, if the wall thickness is less than 0.5 to 5.0 mm, there is a possibility that the color ink drop-wise added to the region will ooze out of the region.

An STL data format is employed in the controller (not shown in the figures) of the shaping apparatus in order to implement the formation method shown in FIG. 6. The STL format by itself has no color information. For this reason, files for each color are created in the controller and identification of various colors is executed.

Figure 7:
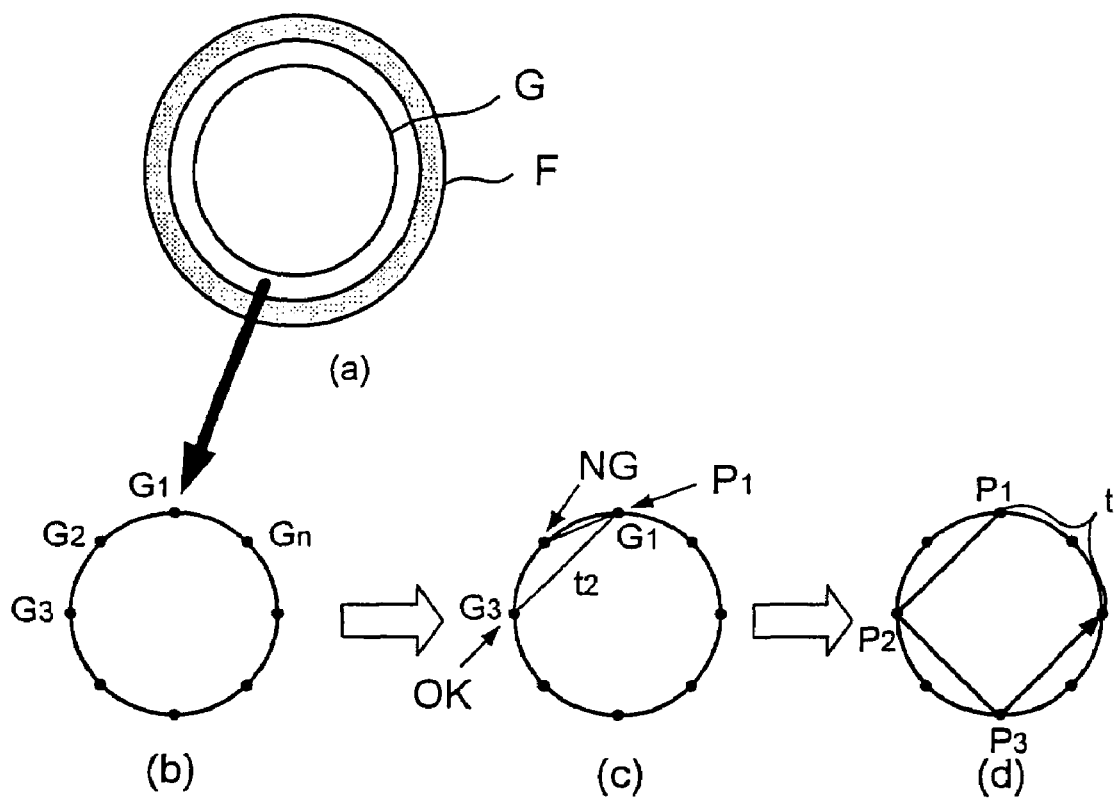
FIG. 7 illustrates an example of the method for coloring a layer composed of a photo-curable resin, while suppressing the build-up of the colorant (color ink)

FIG. 7 illustrates an example of a method for coloring a layer consisting of a curable resin, while suppressing the build-up of the colorant (color ink).

As described above, the color ink dropped onto a photo-curable resin in a liquid-phase state diffuses over the resin liquid surface. Therefore, data (coloration data) used to cause the adhesion of color ink to the photo-curable ink should not be as specific as data (shaping data) used when the photo-curable resins in a liquid-phase state are laminated and shaped. If the coloration data are too specific, the amount of added color ink is increased accordingly and the added color ink builds up in the pool region in the colored layers ($5_2$, $5_{n-1}$) shown in FIG. 3 or in the groove region in the colored layers ($5_3 \sim 5_{n-2}$) shown in FIG. 4, thereby hindering the above-mentioned lamination and shaping. In order to guard against such a possibility, the so-called thinning of coloration data was conducted. In FIG. 7, in order to simplify the explanation and graphic representation, the lamination and shaping process is illustrated based on a colored shaped article of round shape, as viewed from the upper/lower surface.

In FIG. 7(a), the colored region F shows shaping data relating to shaping of a colored layer having a disk-like shape. The concentric circular arc G positioned on the inner periphery thereof represents the original coloration data produced by offsetting the shaping data through a certain distance, that is, the trajectory of nozzle 7 of the above-mentioned dispenser (not shown in the figure). The so called thinning of coloration data is conducted according to the below-described procedure by using this circular arc G.

First, as shown in FIG. 7(b), a plurality of equidistant apexes $G_1$ through $G_n$ are determined on the coloration data (circular arc G). More specifically, the apexes $G_1$ through $G_n$ are determined by finding the coordinates indicating the apexes $G_1$ through $G_n$. Then, as shown in FIG. 7(c), for example, an apex $G_1$ selected from the apexes $G_1 \sim G_n$ is determined as an initial point $P_1$ of coloration data and the apex $G_3$ separated from this initial point $P_1$ by a distance of no less than the prescribed distance t is assumed to be a second point $P_2$ of coloration data, following the initial point $P_1$. By the same procedure, as shown in FIG. 7(d), the third point $P_3$ of coloration data, . . . , and n-th point of coloration data, that is, the final point $P_n$ is found. The final point $P_n$ should be selected so as to be separated from the initial point $P_1$ by a distance of no less than the aforesaid distance t. The colorants are added in respective prescribed amounts in the points $P_1$, $P_2$, $P_3$, . . . , $P_n$ that were thus selected.

Figure 8:
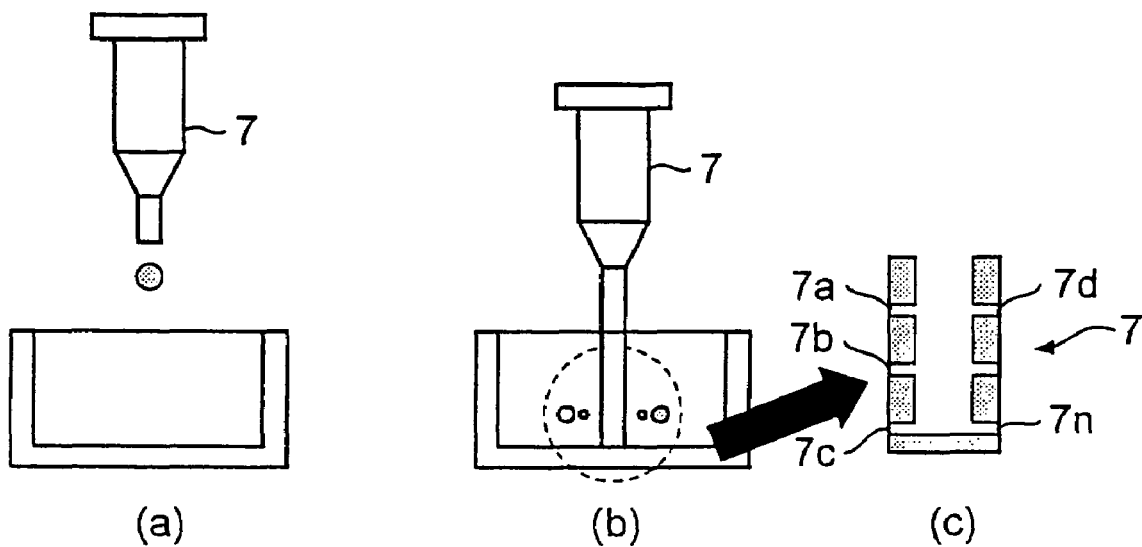
FIG. 8 illustrates another example of the coloration method shown in FIG. 7.

FIG. 8 illustrates another example of the coloration method described with reference to FIG. 7.

As described above, when a photo-curable resin in a liquid-phase state is coated, there is a possibility that color ink would not diffuse uniformly in the coloration region and coloration defects can be produced. Accordingly, the below-described measures were taken to prevent such defects.

Initially, as shown in FIG. 8(a), the color ink was dropped from the nozzle 7 of a dispenser (not shown in the figures) located at a height of 5 to 10 mm above the surface of the photo-curable resin in a liquid-phase state. However, modifying the structure of nozzle 7 so as to obtain a sufficient strength and a shape allowing for insertion into the photo-curable resin in a liquid-phase state and removal therefrom makes it possible to conduct coloration by inserting the nozzle 7 into the photo-curable resin in a liquid-phase state, as shown in FIG. 8(b). Inserting the nozzle 7 into the photo-curable resin in a liquid-phase state allows for coloration in a state in which the color ink was greatly diffused. Furthermore, spattering of ink is also prevented and accurate control of the vertical position of nozzle 7 becomes unnecessary. Moreover, if a nozzle with a plurality of transverse holes $7a \sim 7n$ in a side surface, which is shown in FIG. 8(c), is used as the nozzle 7, the coloration can be conducted in a state in which the color ink was diffused even more significantly.

With another method for uniformly diffusing the color ink added to the photo0curable resin in a liquid-phase state in the coloration region, the color ink is dropped after being heated inside the dispenser (not shown in the figures) or in the nozzle 7. If a color ink is at a low temperature, the viscosity thereof is higher. As a result, the diffusion thereof requires certain time. Therefore, the color ink added to the non-cured portions of the photo-curable resin, such as the above-described pool or groove, does not diffuse uniformly and coloration defects are produced. However, if the color ink dropped upon heating, because the viscosity is low, the ink diffuses within a comparatively short time. As a result, the coloration defects are prevented. Furthermore, the internal structure of nozzle 7 can be modified to provide for more uniform diffusion of color ink and more effective elimination of coloration defects. Thus, a structure may be used in which longitudinal holes opened in the bottom portion of nozzle 7 are provided in addition to transverse holes $7a \sim 7n$ shown in FIG. 8(c).

Figure 9:
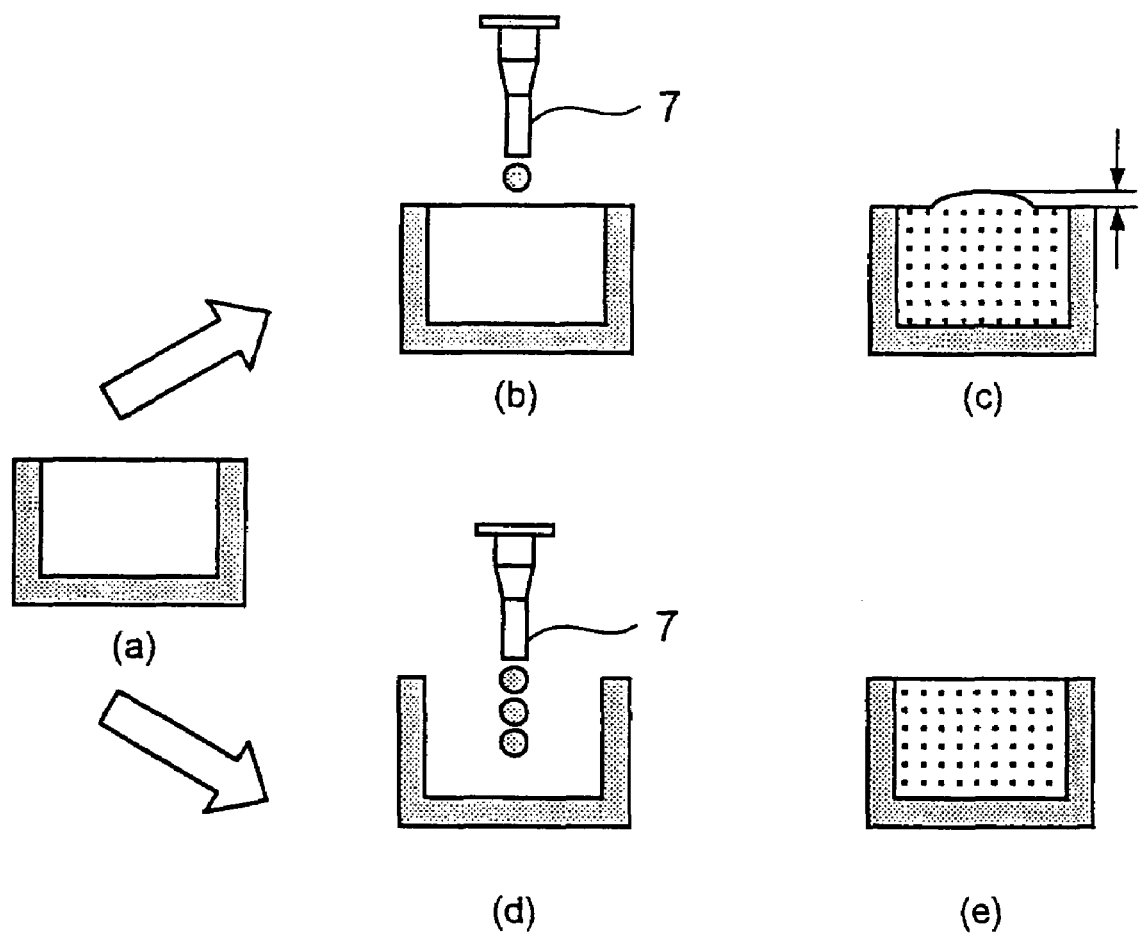
FIG. 9 illustrates still another example of the coloration method shown in FIG. 7 and compares the results obtained by the coloration methods shown in FIG. 7 and FIG. 8.

FIG. 9 shows still another example of the coloration method illustrated by FIG. 7 and compares the results obtained by the coloration methods illustrated by FIG. 7 and FIG. 8.

With the coloration methods illustrated by FIG. 7 and FIG. 8, first, as shown in FIG. 9(a) only the external wall was cured and the region corresponding to the pool (or groove) was left in a liquid-phase state. Then, as shown in FIG. 9(b), a color ink was dropped from the nozzle 7 of a dispenser (not shown in the figures) into the pool (or groove) region which was in a non-cured state. As a result, as shown in FIG. 9(c), a build-up in an amount of the dropped color ink appeared in the pool (or groove) region, and shaping of the next layer on the upper surface of the layer shown in the figure was impossible at a lamination pitch with a thickness of no more than the build-up. In other words, a small lamination pitch could not be set.

Accordingly, in the present example, as shown in FIG. 9(a), only the external wall was cured and the region corresponding to the pool (or groove) was left in a liquid-phase state. Then, as shown in FIG. 9(d), the photo-curable resin in a liquid-phase state located in the region corresponding to the pool (or groove) was sucked out and a color ink was dropped from the nozzle 7. With such a method, since the photo-curable resin (in a liquid-phase state) located in the region corresponding to the pool (or groove) was removed, there is no build-up which is caused by the color ink dropping, as shown in FIG. 9(e).

A method of applying air pressure to the dropping site of color ink is still another means for preventing the build-up of color ink dropped on the non-cured photo-curable resin. Furthermore, a method of applying vibrations to the dropping site of color ink is a means for preventing the build-up of the color ink and also enhancing the diffusion thereof.

For example, compositions prepared by admixing pigments, dyes, or inks prepared by using them as raw material to the photo-curable resin in a liquid-phase state, and compositions prepared by dissolving pigments or dyes in solvents other than photo-curable resins in a liquid-phase state can be used as the above-mentioned color ink. As for the compositions prepared by dissolving pigments or dyes in solvents other than photo-curable resins in a liquid-phase state, they should have affinity with photo-curable resins, in other words, they should not hinder the curing of photo-curable resins. Moreover, compositions using fibers or color beads instead of pigments and dyes can be also used as the color ink.

The explanation given above was based on the assumption that an external wall surrounding the pool (or groove) region is present. However, a shaping method which requires no external wall can be also implemented by adding a color ink to a non-cured photo-curable resin in a plurality of cycles. Such a shaping method comprises the following steps.

First, only one layer of a photo-curable resin layer is cured and a thin film is formed by irradiating the photo-curable resin in a liquid-phase state with a laser beam. Then a color ink is added on the thin film according to the offset data (data obtained by offsetting the contour shape data inward by about 0.5 to 5.0 mm) of shaping data (data representing the contour shape of colored shaped article) of colored shaped article. When the colored surface is the upper surface or lower surface of the layer, the color ink is added inside the contour line determined by the data obtained by offsetting the contour data of the upper surface or lower surface inward. When the build-up of the color ink thus added is small, the addition of color ink is repeated multiple times and the build-up of the added color ink is formed within a range in which the prescribed lamination pitch is not reached. Further, in a state in which the added color ink is sufficiently dried (cured) to a degree producing no adverse effect on the next operation, a photo-curable resin in a liquid-phase state is added onto the surface thereof, this resin being required for forming the next layer. Then, the photo-curable resin in a liquid-phase state is irradiated with a laser beam according to the shape data of the next layer and the photo-curable resin is cured so as to obtain the prescribed shape.

The desired colored shaped article is formed by repeating the above-described process the required number of times.

With this method, the build-up with a prescribed thickness is formed from a color ink by multiple addition of the color ink. However, instead of adding the color ink, a color sheet having a thickness that does not exceed the lamination pitch may be cut to the desired shape and then glued to the liquid-phase, photo-curable resin. In such a case, a color sheet having a thickness that does not exceed the lamination pitch may be cut to the desired shape after gluing to the liquid-phase photo-curable resin. A color sheets having a thickness exceeding the lamination pitch is preferably not used because it hinders lamination and shaping.

Furthermore, a method of adding a viscous color ink, for example, a color resin only one time can be used instead of the method of multiple addition of color ink. With such a method, the addition of color resin is conducted while the thickness of coating film formed by adding the color resin is being controlled so that it approaches as close as possible to the thickness of lamination pitch.

Furthermore, a method in which a color ink is dropped onto a liquid-phase, photo-curable resin after recoating and the liquid-phase photo-curable resin is cured faster than the dropped color ink diffuses into the photo-curable resin can be used as a shaping method that does not require the formation of the above-mentioned external wall. In other words, with such a method the outflow of color ink into a region which is not to be colored is prevented by conducting dropping of color ink and curing of the liquid-phase photo-curable resin practically at the same time.

Moreover, if the color ink is in a state in which it does not diffuse in the resin, for example, when the particles of color ink are embedded in a photo-curable resin, the desired colored shaped article can be formed by adding (printing) a color ink to the resin after recoating (that is, a liquid-phase photo-curable resin), for example, by using a mechanism similar to that of ink-jet printers and then repeating the process of curing the resin for each layer.

Figure 10:
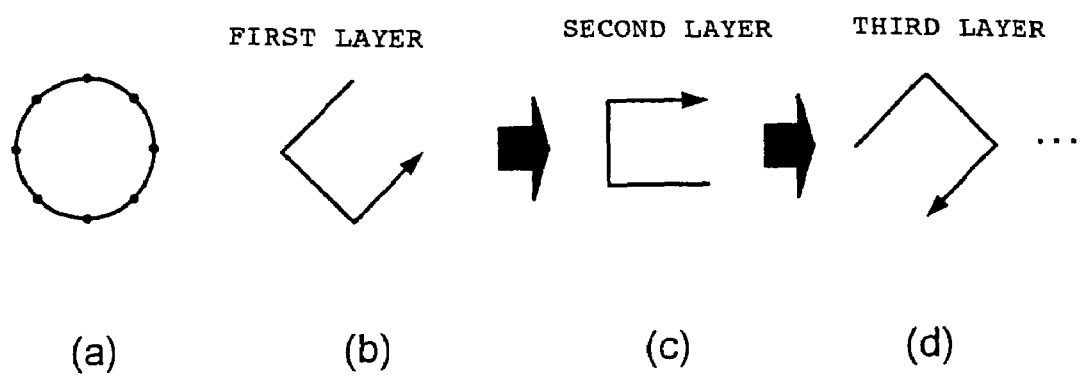
FIG. 10 illustrates an example of the method for coloration of layers in the colored shaped article composed of a photo-curable resin based on the method shown in FIG. 7, in a state in which the coloration regions are averaged over the entire shaped article.

FIG. 10 illustrates an example of a method by which coloration in the layers of a colored shaped article consisting of a photo-curable resin in a state in which the coloration region is averaged over the entire body, based on the method illustrated by FIG. 7.

In this example, coloration was conducted by using thinning coloration data in which the initial points were randomly made different for all of the layers, so that in the apexes $P_1 \sim P_n$ (FIG. 10($a$)) located on a circular arc G obtained by the method illustrated by FIG. 7, the thinning coloration data having the apex $P_1$ as the initial point were used for the first layer (FIG. 10($b$)), the thinning coloration data having the apex $P_3$ as the initial point were used for the second layer (FIG. 10($c$)), and the thinning coloration data having the apex $P_2$ as the initial point were used for the third layer (FIG. 10($d$)).

Accordingly, the colorant (color ink) addition regions based on those coloration data are shifted in each of the layers and, as a result, the colorant addition regions are averaged and dispersed, as viewed over the entire colored shaped article.

Figure 11:
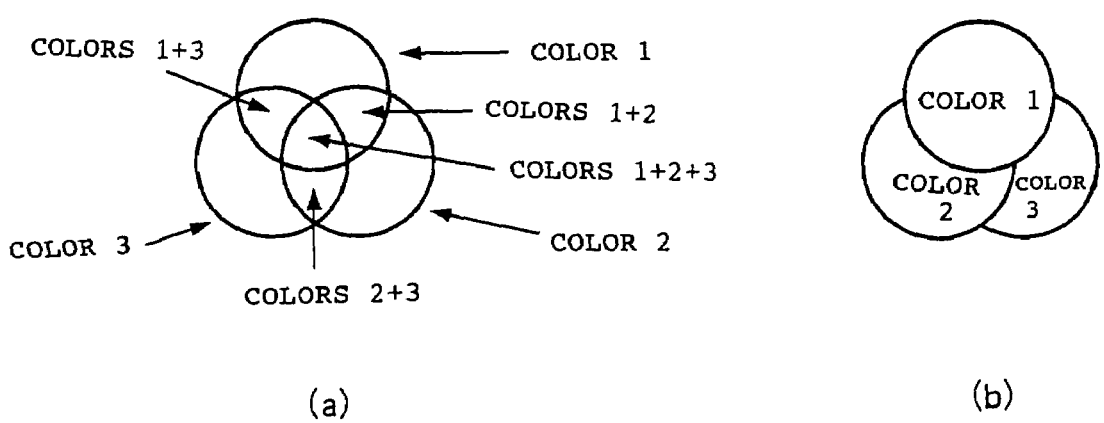
FIG. 11 illustrates an example of the method for multi-color addition to a layer composed of a photo-curable resin, without the reduction in size of the colored region.

FIG. 11 illustrates an example of a method for multicolor coloration of a layer consisting of a curable resin, without decreasing the size of coloration region.

In case of multicolor coloration of a colored shaped article, unless the priority or colors in coloration is determined in advance, a region in which coloration is conducted with a color other than the color relating to coloration data will expand, as shown in FIG. 11($a$). In the example shown in FIG. 11($a$), though the colors of coloration data are color 1, color 2, and color 3, actually, a portion in which the coloration region of color 1 and the coloration region of color 2 overlap, a portion in which the coloration region of color 1 and the coloration region of color 3 overlap, a portion in which the coloration region of color 2 and the coloration region of color 3 overlap, and a portion in which the coloration regions of color 1, color 2, and color 3 overlap expand correspondingly. Sometimes coloration is not actually conducted in the above-mentioned overlapping regions and partitions are provided between various coloration regions. In such a case, the partitioned regions assume an appropriate size, as compared to the coloration region. As a result, the coloration regions are reduced in size.

In the present example, a priority of colors was established during coloration. The priority can be freely determined depending on what color of the colored shaped article should be conspicuous, in user's opinion. For example, if among the above-mentioned color 1, color 2, and color 3, color 1 should be the most conspicuous, followed by color 2, then coloration with the above-mentioned color separation is conducted according to the pattern shown in FIG.

11(b). As a result, the reduction of coloration regions in size caused by the multicolor addition can be prevented.

The explanation given above merely related to an embodiment of the present invention and obviously imposed no limitation on the present invention. Thus, the present invention can be implemented in various other modifications.

What is claimed is:

1. A process for producing a colored region and a non-colored region in at least one layer of a colored shaped article comprising a plurality of layers funned by lamination and shaping of a curable resin, said process comprising the steps of:
   forming said non-colored region by curing a first portion of a liquid state curable resin, said first portion corresponding to a contour line of said at least one layer;
   forming said colored region by adding a colorant into a second portion of said liquid state curable resin and curing said second portion, wherein the second portion is surrounded by said first portion.

2. A process for producing a colored region in at least one layer of a colored shaped article comprising a plurality of layers formed by lamination and shaping of a curable resin, said process comprising the steps of:
   forming an external wall by curing a portion of a liquid stale curable resin corresponding to a region of prescribed width along a contour line of said colored region;
   forming said colored region by adding a colorant to said liquid state region inside said external wall; and
   curing said colored region.

3. The process for producing colored shaped article according to claim 2, wherein a step of forming partition walls by curing the partition zones of prescribed thickness inside the region which is to be colored is implemented prior to the step of adding a colorant.

4. The process for producing colored shaped article according to claim 2, wherein said colored region is formed by adding a prescribed amount of the colorant at prescribed distance intervals by using an addition mechanism displaced by feedback-corrected pulse signals.

5. The process for producing colored shaped article according to claim 2, wherein said step of adding a colorant comprises the steps of:
   removing the liquid state curable resin present in said region which is to be colored; and
   adding the colorant into said region after the removal of said curable resin.

6. The process for producing colored shaped article according to claim 2, wherein the addition of colorants of a plurality of colors into said region which is to be colored is conducted by adding the colorants in a sequence starting from the colorant with a color of the highest priority based on the predetermined order of priority.

* * * * *